(12) United States Patent  (10) Patent No.: US 7,488,100 B2
Roberts                    (45) Date of Patent:     Feb. 10, 2009

(54) BICYCLE LIGHT (76) Inventor: Samuel Roberts, 481 N. Igo Way, Tucson, AZ (US) 85710

( * ) Notice: Subject to any disclaimer, the term of this patent is extended or adjusted under 35 U.S.C. 154(b) by 276 days.

(21) Appl. No.: 11/127,894

(22) Filed: May 10, 2005

(65) Prior Publication Data
US 2005/0213338 A1 Sep. 29, 2005

Related U.S. Application Data (63) Continuation-in-part of application No. 10/655,080, filed on Sep. 3, 2003, now Pat. No. 7,021,800.

(51) Int. Cl.
B62J 6/00 (2006.01)
(52) U.S. Cl. .................. 362/473; 362/184; 362/297
(58) Field of Classification Search ............... 362/551, 362/581, 511, 500, 545, 184, 297
See application file for complete search history.

(56) References Cited

U.S. PATENT DOCUMENTS 5,283,547 A * 2/1994 Leon ........................ 340/432
5,384,693 A * 1/1995 Schwaller et al. ........... 362/473
6,530,683 B1 * 3/2003 Ohkohdo et al. ........... 362/511
6,822,357 B2 * 11/2004 Hung ...................... 310/75 C
6,824,284 B2 * 11/2004 Chinniah et al. ............. 362/27
6,871,988 B2 * 3/2005 Gebauer et al. ............ 362/511
6,897,201 B2 * 5/2005 Boyer et al. ................. 514/51
7,021,800 B2 * 4/2006 Roberts .................... 362/473
7,063,391 B2 * 6/2006 Peng ...................... 301/37.41

* cited by examiner

Primary Examiner—Anabel M Ton
(74) Attorney, Agent, or Firm—Mark Ogram (57) ABSTRACT A bicycle light in which a single housing contains a light source emitting light in a first direction, a battery providing energy to the light source, and, a lense mechanism adapted to direct light from said light source in a second direction being substantially perpendicular to said first direction. In one embodiment of the invention, the lense uses the single light source to generate two light beams beings substantially parallel to each other. A snap clip is used to secure the housing to a spoke of a wheel of the bicycle such that said first direction is substantially parallel to said spoke, and the re-directed light from the light source is substantially parallel to the ground.

14 Claims, 8 Drawing Sheets

BICYCLE LIGHT

This is a continuation-in-part of U.S. patent application Ser. No. 10/655,080, entitled "Bicycle Lighting System" filed on Sep. 3, 2003 now U.S. Pat. No. 7,021,800, with Roberts as the inventor.

BACKGROUND OF THE INVENTION

This invention relates generally to bicycles and more particularly to lighting systems used by bicycles.

Since the invention of the bicycle in Scotland in 1838 by Kirkpatrick MacMillian, a blacksmith, there has been a never ending list of advancements to the basic structure. These include a steam powered bicycle in 1868, an amphibious bicycle in 1931, the BMX in 1973, and the supine-recumbent in 1993.

The bicycle's development is during the same time as the automobile's own rapid development and acceptance. Unfortunately, the two vehicles do not work well on the same road; but, due to the existing road system, the two vehicles must come in daily contact.

Unfortunately, the bicycle rider is almost "invisible" to an automobile driver who is watching for much larger obstacles. This often results in a collision in which the bicycle rider is always the one who suffers the most.

In an effort to minimize these collisions, there has been a recognition that the more "visible" the bicyclist is, the safer the bicyclist is. To this end, a large number of devices have been developed to assist in enhancing the visibility of the bicyclist. These include: flourescent shirts, blinking lights secured to back-packs, head-lamps and tail lamps, and even flags.

While all of these do assist in creating a more visible bicyclist, there is still a significant need to create an even more increased attention-getting situation.

It is clear there is a need for a light system which is more attention grabbing so as to protect the bicyclist more.

SUMMARY OF THE INVENTION

While the following discussion relates to a bicycle, the invention is not so limited and is intended to include any wheeled vehicle which uses a spoked wheel. This includes: children's tricycles, adults tricycles, motorcycles, automobiles with spoked wheels, and other such vehicles obvious to those of ordinary skill in the art.

The invention creates a lighting system for a vehicle which utilizes a central housing having an electrical power source therein. The electrical source ideally is a series of batteries. In some embodiments of the invention, the batteries are rechargeable from either an external source (fed through a connector to the batteries) or are charged by a generator mounted on the bicycle itself.

The central housing is secured to the spokes of a wheel of the vehicle and as such is engineered to move with the wheel. In the preferred embodiment, the central housing is secured to the spokes and between the spokes. The central housing is made of two rigid parts. A first part is placed within the spokes and then the other part is "snapped" or otherwise secured to each other.

In this manner, the central housing is secured to the vehicle by a frictional connection with the spokes; thereby eliminating the need for any modification to the vehicle or its wheels. In some embodiments the housing is also secured to the spokes using a compression nut arrangement.

Connected to the central housing and its electrical source are preferably at least two light emitting units which are also secured to the spokes of wheel. Ideally these light emitting units are placed towards the periphery of the wheel (at the end of the spokes) so that maximum movement is perceived.

In the preferred embodiment, electrical current is communicated to the light emitting units through the use of coiled wires which are wrapped around the spoke leading to the light emitting unit. This provides a secure base for the wires so that movement, and hence wear, is minimized.

The light emitting units are secured to the spokes through a variety of techniques. In the preferred embodiment, the housing of the light emitting unit is snapped around the spoke and then secured using a screw-type of clamping mechanism.

These light emitting units are powered by the electrical source from the central housing and emit light substantially perpendicular to the plane formed by the wheel. This is accomplished by the structure of the lenses within the light emitting units which are positioned so that once the unit is snapped onto the spoke, light is emitted substantially perpendicular to the wheel's plane.

Also, in the preferred embodiment, light is transmitted on both sides of the wheel.

In the preferred embodiment, the central housing uses three different units. One unit serves as a "master" and has a controller within it. This controller, in the preferred embodiment, is "programable" by the user using a remote or attached keyboard. Using this input, the controller selectively activates the light emitting units in a selected pattern. A position sensor within the "master" unit communicates the wheel's position to the controller so that the lights are activated as programmed.

As example, the lights might only be activated when they are in one of the four principal axis, thereby generating a "pulsing" affect to catch the attention of other motorists.

Also, by using light generators which can emit selected colors, the controller is able to change the color of the light being emitted based upon the position of the light emitting unit. As example, when the light emitting unit is at its highest point, the color may be red while at the bottom point, the light might turn to green, with the intermediate points being yellow.

Again, this capability provides for a heightened visibility and thus, greater protection for the bicyclist.

With the controller and its attendant sensors within one housing, in the preferred embodiment, the power sources are secured within the other two units. In one embodiment of the invention, the batteries are removable. This allows other devices to be placed within the battery compartment to accommodate "add-on" devices. One such "add-on" device is a pump which is used to re-inflate a wheel after a hole has been patched. Those of ordinary skill in the art recognize other such "add-ons", including but not limited to, additional light sources.

In this manner, the controller is able to adjust the timing of the lights so that more attention is generated.

In another embodiment of the invention, a single housing is used to contain: the light source, the battery, and a lense mechanism. In this embodiment, the housing (being self contained) is secured to the spoke of the wheel.

In an alternative to this embodiment, various other circuits are also contained within the housing. These embodiments allow the user to select if the light source is to emit light in a continuous or a flashing mode. Other embodiments of this alternative provide circuitry which automatically: activates the light source in a dim environment; terminate the emission of light from the light source should the bicycle be inactive for a set period of time; or, flash the light source during slow or fast motion of the housing.

The light source is situation to direct light from said light source in a first direction into the lense mechanism which then redirects the light substantially perpendicular to the first direction. This assures that the light, which is directed substantially parallel to the spokes of the bicycle, is directed substantially parallel to the plane of the ground so that the light is most visible to others.

The battery, also contained within the enclosure/housing, provides the energy to the light source.

In one embodiment of this alternative embodiments, the lense provides two light beams from the single light source. These two beams are either co-linear or are parallel to each other; hence, the two beams are both parallel to the ground allowing the single light source to provide a warning light on both sides of the bicycle.

A snap clip is used to secure the housing to a spoke of a wheel of the bicycle such that the light from the light source is substantially parallel to the spoke; This arrangement for positioning the light beam from the light source provides a reference, assuring that the re-directed light is substantially parallel to the ground.

The invention, together with various embodiments thereof, is described in more detail by the accompanying drawings and the following descriptions thereof.

DRAWINGS IN DETAIL

Figure 1A:
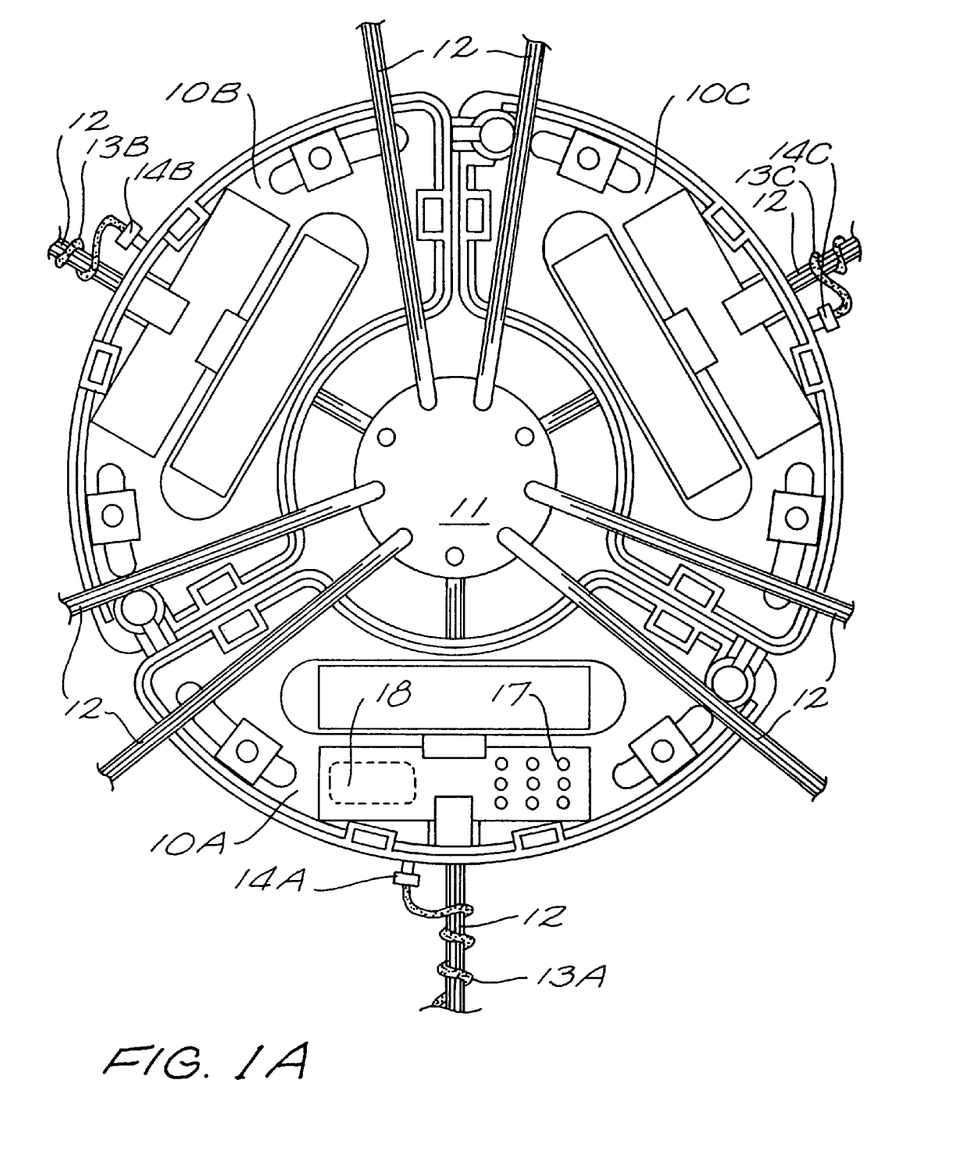
FIG. 1A and 1B illustrate the preferred embodiment mounted to the spokes of a bicycle wheel.
Figure 1B:
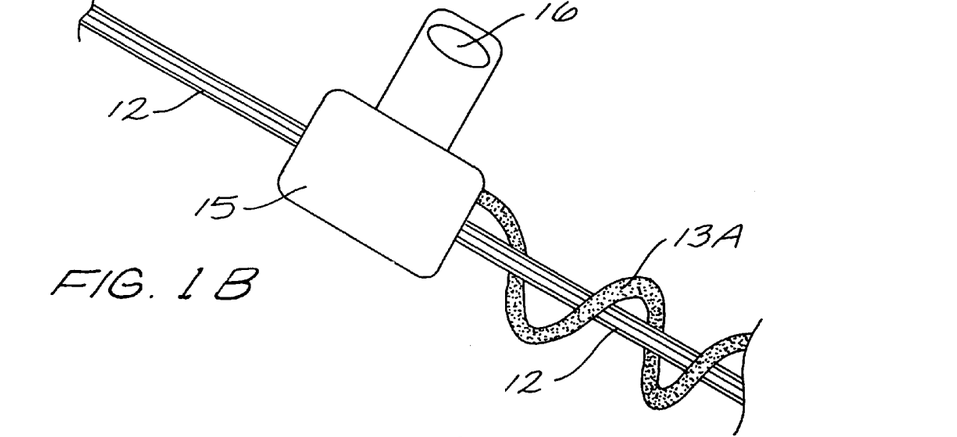

FIGS. 1A and 1B illustrate the preferred embodiment mounted to the spokes of a bicycle wheel.

Referencing FIG. 1A, the traditional bicycle wheel has a central rim 11 with spokes 12 extending outward to the tire (not shown). Interwoven within the spokes are interlocked casings 12A, 12B, and 12C. While this embodiment shows three casings, the invention is not so limited and can include any number of casings, including a single casing.

In this embodiment, casings 12A, 12B, and 12C, form the central housing which contain the control mechanism and the power supply. Each casing 12A, 12B, and 12C are connected to an associated remote light emitting unit (not shown, see FIG. 1B) via wires 13A, 13B, and 13C respectively. Wires 13A, 13B, and 13C are wound around an associated spoke 12 for mechanical attachment and are connected to their related casing via connectors 14A, 14B, and 14C respectively.

Control of the lights is made by processor/controller 18 which contains a position sensor. Commands from the operator via key-pad 17. In this way, processor 18 is able to be activated and its operation is defined by the operator.

In the preferred embodiment, when the position sensor fails to indicate motion for a set period of time (to minutes in the preferred embodiment), controller/processor 18 terminates operation.

A light emitting unit is shown in FIG. 1B. Wire 13A is wound around spoke 12 to light emitting unit 15. Light is emitted from light emitting unit 15 via window 16.

Light emitting unit 15 is secured to the spoke via a locking nut (not shown). In like fashion, casings 10A, 10B, and 10C are also secured to the spokes using a locking nut (also not shown).

Figure 2:
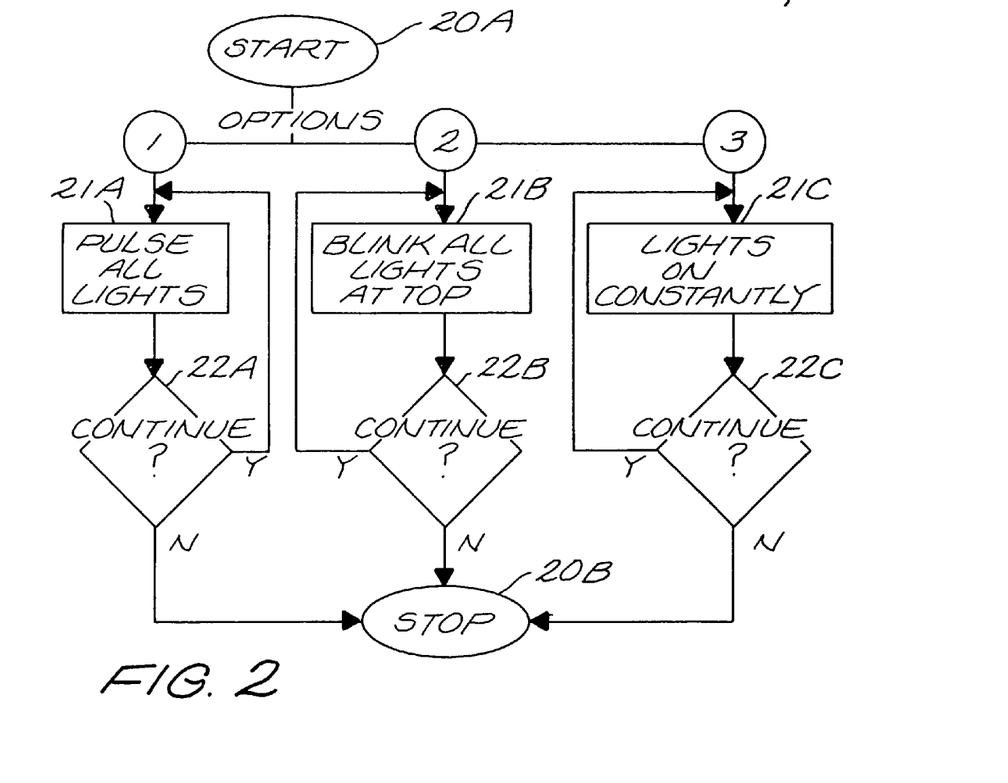
FIG. 2 is a flow-chart of the operation of the process for an embodiment of the invention.

FIG. 2 is a flow-chart of the operation of the process for an embodiment of the invention.

Once the program has started, 20A, the option chosen by the operator is determined. The first option is to pulse all lights 21A. This continues until the operator selects to not continue 22A (or a "time-out" for lack of motion for two minutes) and the program stops 20B.

Another option available on this embodiment is to blink the lights when they are at a "top" position 21B. Again, this continues until the operator indicates that the operation is not to continue or "time out" 22B and the mechanism stops 20B.

In similar fashion, all of the lights are constantly activated 21C (with one embodiment using different color of lights); this continues 22C until the operator decides to discontinue the operation 22C and the program stops 20B.

Since the processor (# 18 in FIG. 1A) is equipped with a position sensor, control of the lights is easily accomplished to give the desired visual affect.

Figures 3A, 3B:
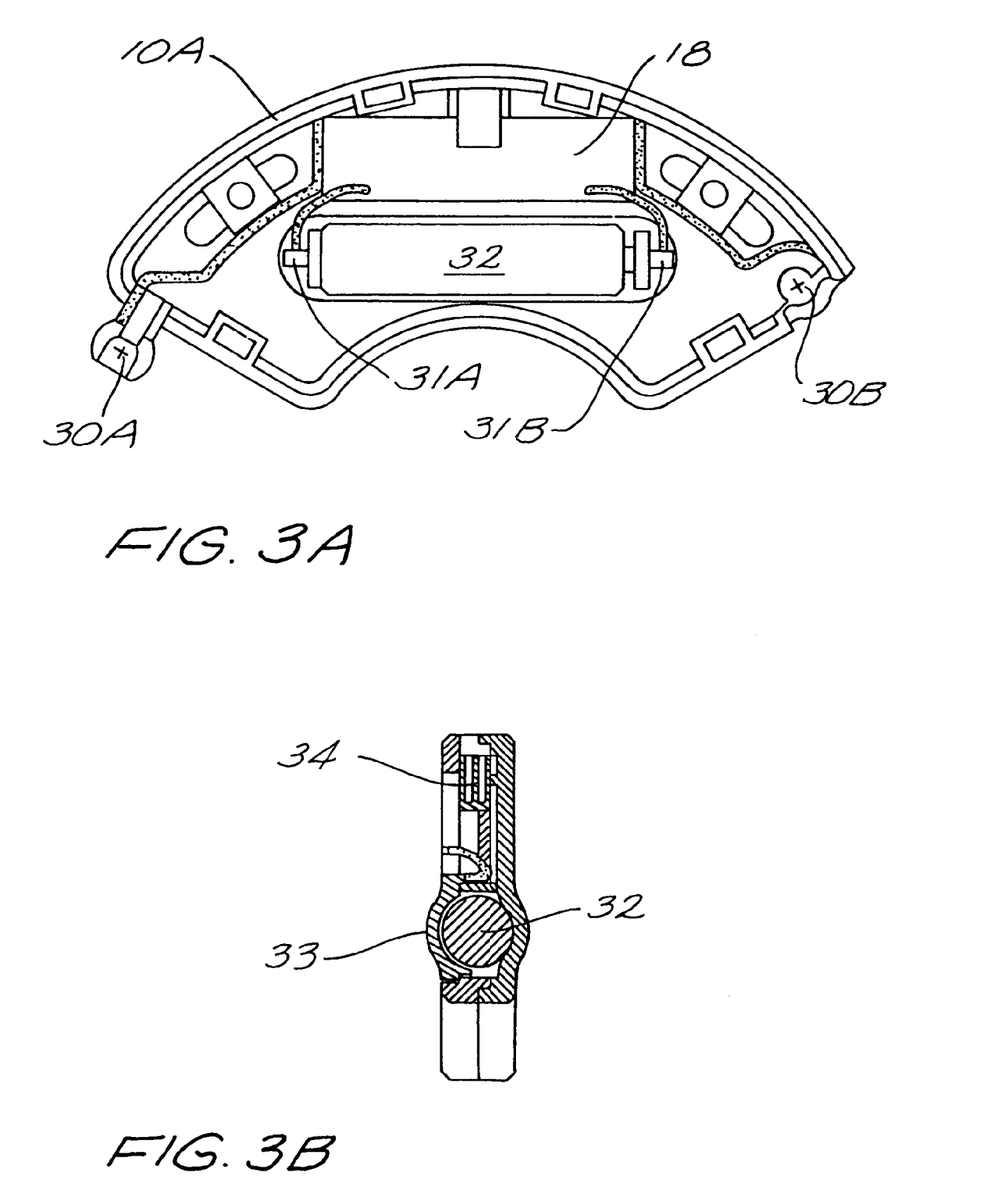
FIGS. 3A and 3B are views of a single compartment of the preferred embodiment's central housing.

FIGS. 3A and 3B are views of a single compartment of the preferred embodiment's central housing.

These figures illustrate the "master" compartment which contains the processor 18 therein. The two other compartments, as illustrated in FIG. 1A, are "slave" units that provide electricity for the operation and also controlled by the "master". The "slave" units are substantially identical as the "master" except they do not contain a processor.

Unit 10A includes battery 32 which is connected to the electronics via negative contact 31A and positive contact 31B.

This unit is connected, both mechanically and electrically, with its neighbor units via male pivot 30A at one end and female pivot 30B at the other end (connecting with its opposing member of the neighboring compartment). This allows the three units to be "snapped" to each other for both mechanical connection as well as providing electrical connection so that the "slave" units are controlled by the "master" unit.

Battery door 33 permits the battery to be removed and replaced. Further, in some embodiments of the invention, opening or removing battery door 33 permits the battery to be removed and an accessory placed within the compartment. This permits the accessory to receive its electrical energy from the other two units.

Also, in this embodiment, battery 32 is re-chargeable and is recharged via AC jack 34.

Figure 4:
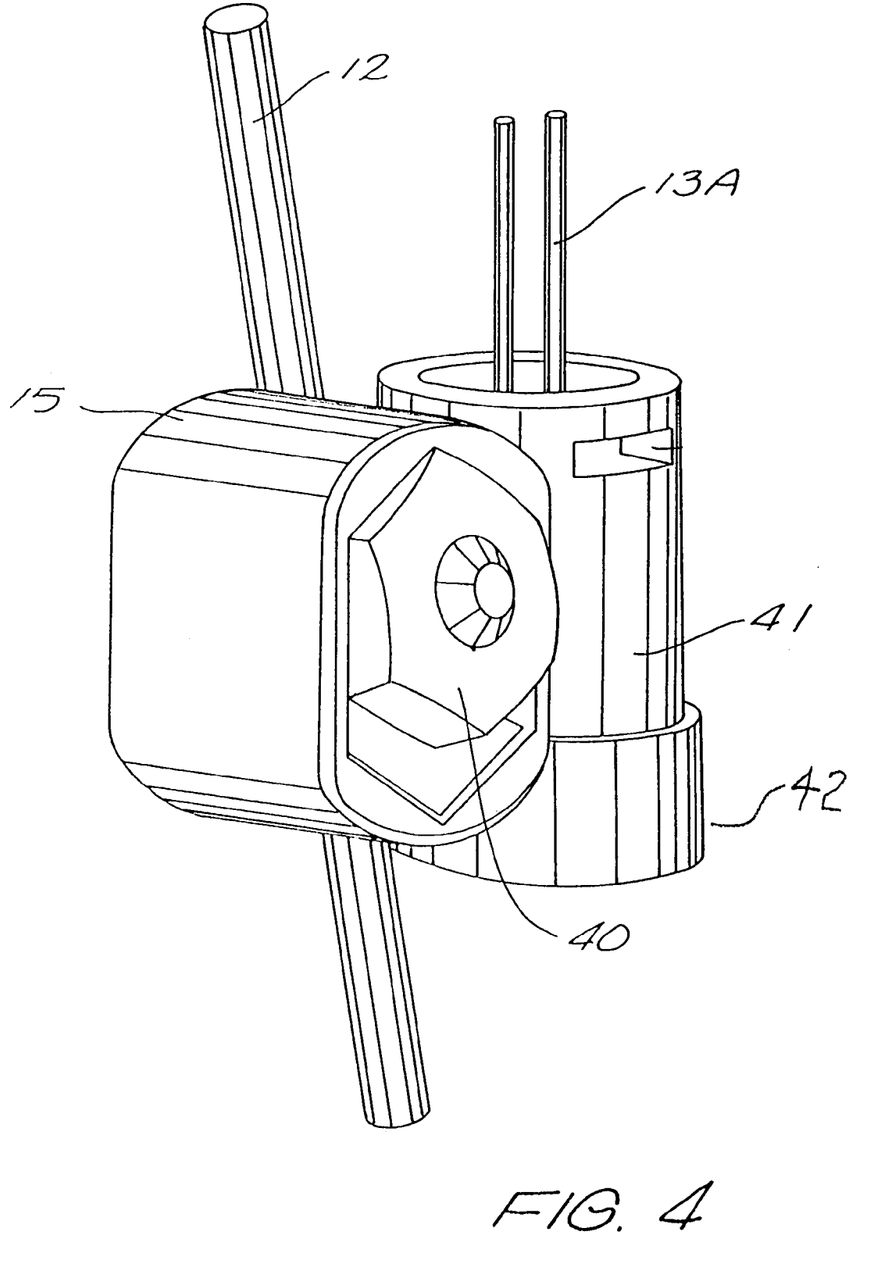
FIG. 4 is a view of the preferred mechanism used to secure the light emitting portion of the invention to the spoke.

FIG. 4 is a view of the preferred mechanism used to secure the light emitting portion of the invention to the spoke.

Light emitting unit 15 is secured to spoke 12 via compression nut 40 which allows the user to place the light at any place along spoke 12 that the user desires. Once placed, light emitting unit 15 is configured so that light impinges upon prism 42 which disperses the light substantially perpendicular to the plane formed by the wheel of the bicycle (not shown). Prism 42 serves as a lense, thereby redirecting the light being generated to the directions desired.

A similar compression nut is provided on the compartments described above so that they can be mechanically affixed to the spokes.

Electrical energy is provided to the light source contained within housing 41 via electrical wire 13A.

Figure 5:
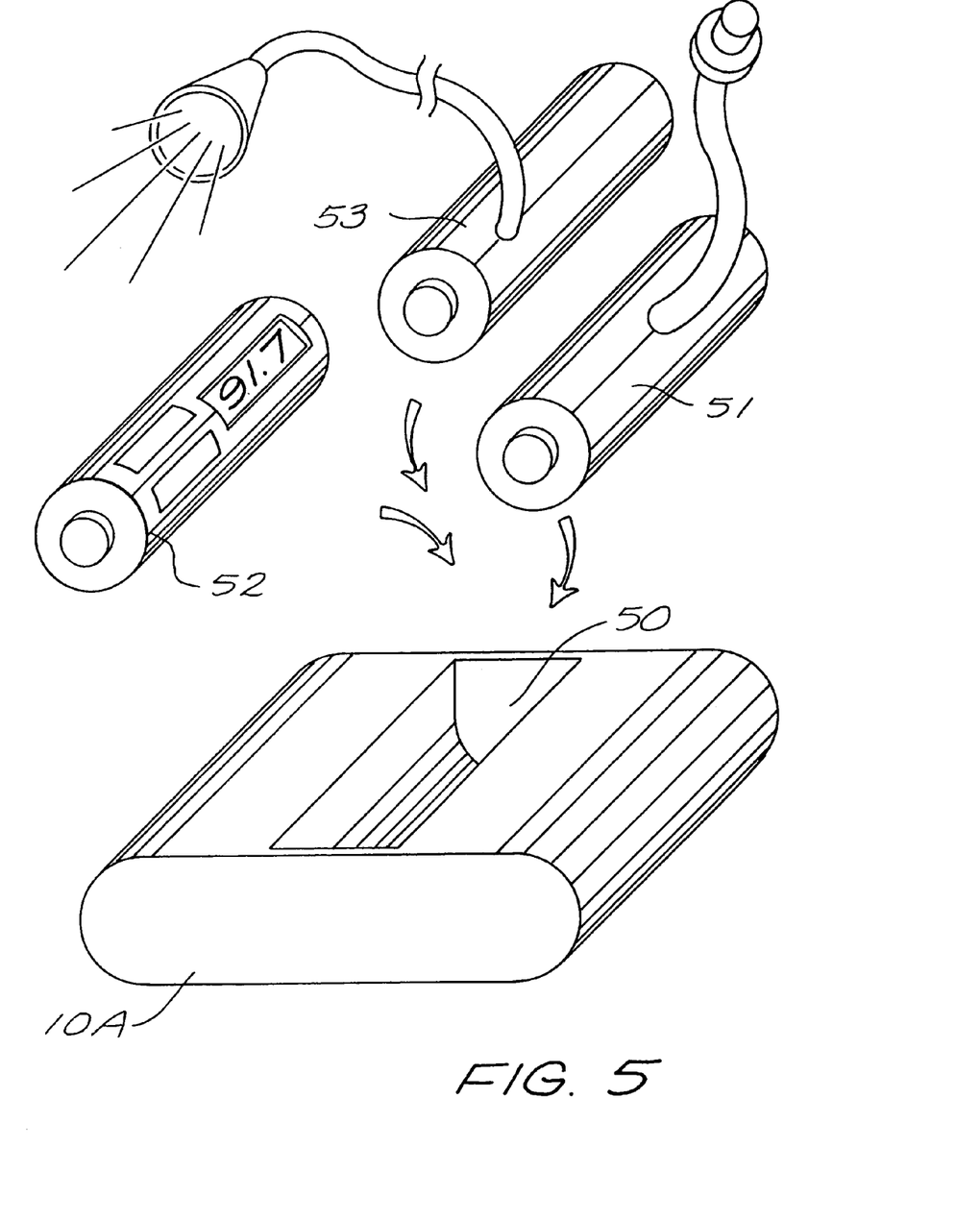
FIG. 5 illustrates the invention's use of "plug-in" apparatus.

FIG. 5 illustrates the invention's use of "plug-in" apparatus.

Unit 10A has its battery removed for illustration purposes. This exposes battery cavity 50, thereby allowing the user to place an accessory apparatus therein. Such accessory apparatus includes tire pump 51, radio 52, or light 53.

In this manner, the electrical energy is drawn from the neighboring units to power the accessory apparatus.

Figure 6:
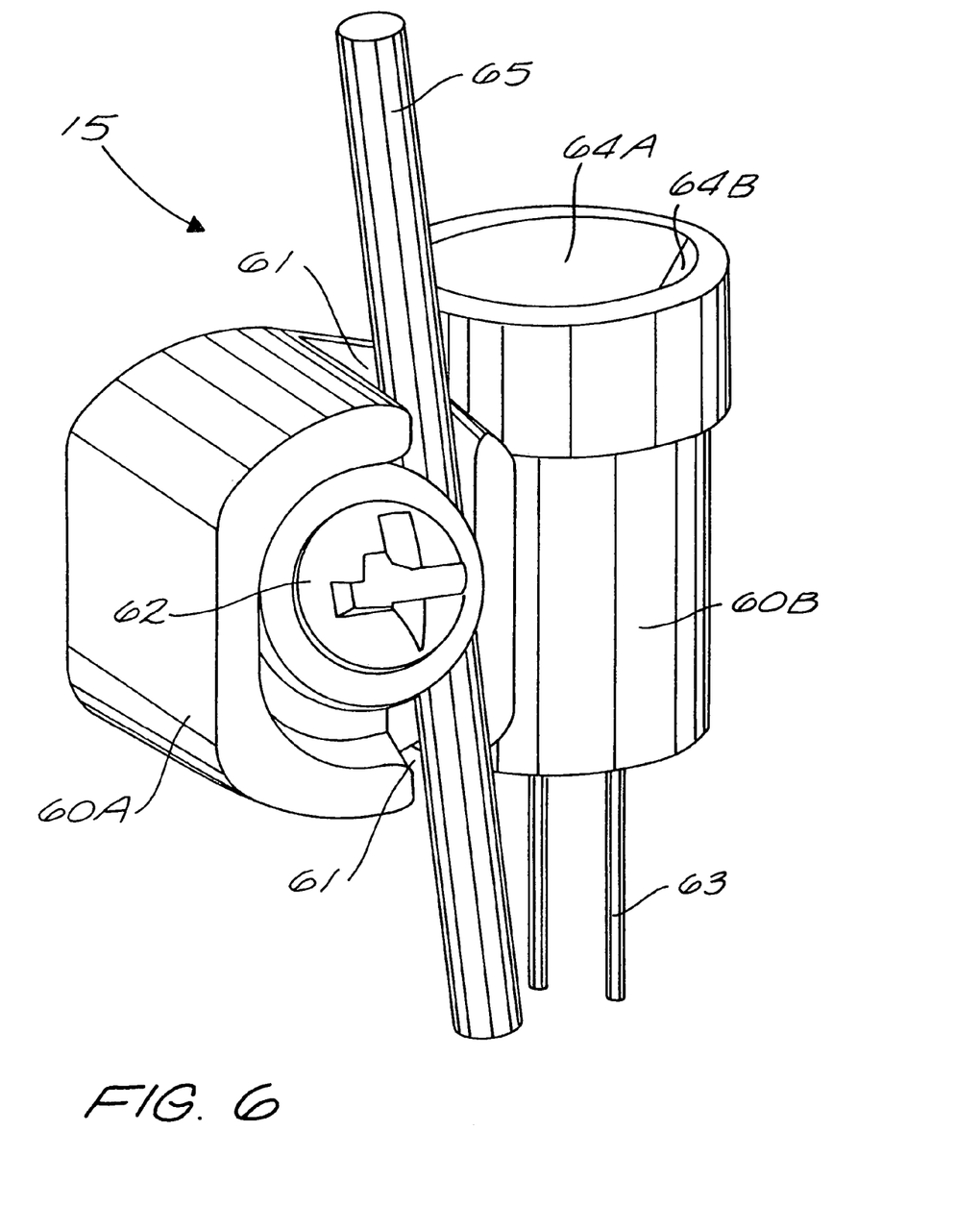
FIG. 6 illustrates the preferred embodiment of the lense mechanism.

FIGS. 6 illustrates the preferred lense mechanism for the light emitting units.

Lense mechanism 15 has two main sections: Clasping mechanism 60A, and Light emitting structure 60B.

Clasping mechanism 60A is secured to spoke 65 by channel 61 which curves to maintain frictional contact with spoke 65. Locking nut 62 is tightened against spoke 65 and secures lense mechanism 15 in the proper location on spoke 65. Locking nut 62 has a degree of "wobble", thereby allowing the lense mechanism to be rotated slightly to allow the installer to direct the light from light emitting structure 60B properly (ideally perpendicular with the plane of the wheel).

Light emitting structure 60B is supplied electricity from wire 63 which communicates with the main bodies described above. The light emitting diode or bulb within light emitting structure 60B (not visible) is directed through lense mechanism 64A and 64B. Through the use of two lenses, the light is split into two directions (both sides of the wheel).

Figure 7:
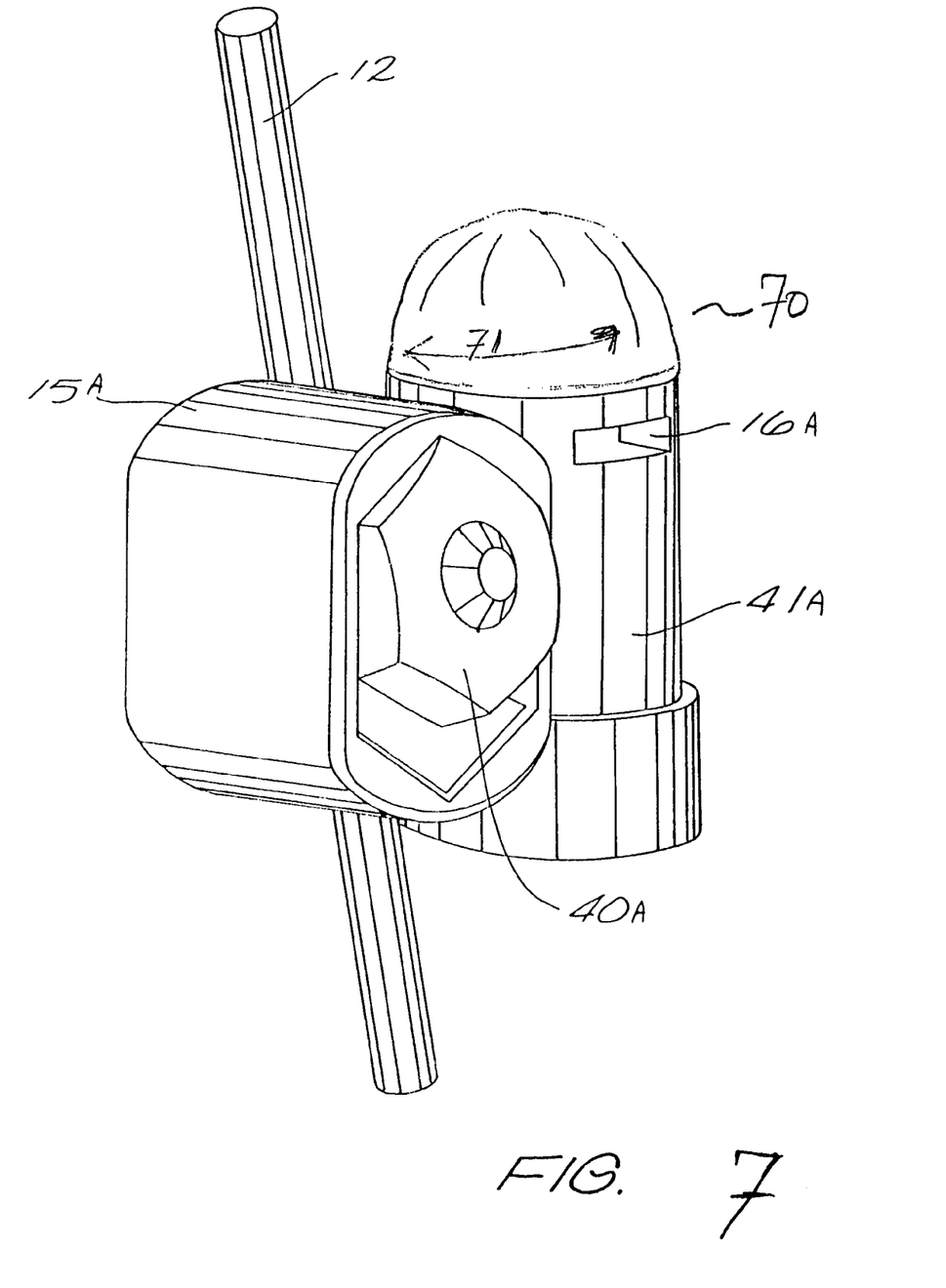
FIG. 7 illustrates an alternative embodiment of the invention.

FIG. 7 illustrates an alternative embodiment of the invention.

This embodiment of the invention provides a single housing 41A which is self-contained and secured onto the spoke of the bicycle wheel. Light emitting unit 15A is secured to spoke 12 via compression nut 40A which allows the user to place the light at any location along spoke 12A that the user desires. Ideally, once placed, light emitting unit 15A is configured so that light exiting from opening 16A is substantially perpendicular to the plane formed by the wheel of the bicycle (not shown). In another embodiment of the invention, a prism is used to disperse the light being generated by the unit. This prism projects the light substantially perpendicular to the housing (and by extension, the spoke of the wheel).

The unit is activated by rotating cap 70 as shown by arrow 71. This rotation selectively closes or opens the switch which connects the battery (not shown) to the light source (not shown) within housing 41A.

This embodiment of the invention permits the user to easily connect a self-contained light source onto the spokes of the bicycle wheel.

Figure 8:
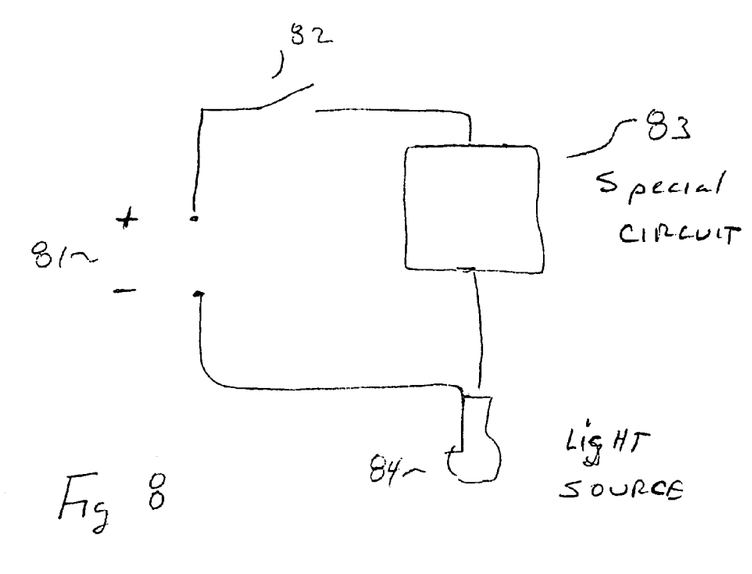
FIG. 8 is a circuit used for one embodiment of the invention.

FIG. 8 is a circuit used for one embodiment of the invention.

While this figure illustrates the preferred circuit, those of ordinary skill in the art readily recognize a variety of other circuits which perform the functions outlined herein.

Battery 81 is selectively connected to special circuit 83 via switch 82. Special circuit 83 is chosen to perform a specialized function; in some embodiments special circuit 83 is omitted altogether. Some of the functions which are performed in various embodiments of the specialized circuit are:

(1) Motion Sensing: This circuit is used to sense when the bicycle is not in use for a period of time. When a lack of motion exists for an extended period, such as five minutes (indicating the bicycle is not in use), the circuit opens switch 82.

(2) Ambient Light Sensing: This circuit monitors the ambient light conditions and closes switch 82 when the conditions are "dim". This assures that the bicycle light of this invention is operating when it is needed.

(3) Flashing: This circuit flashes the electrical current so that light source 84 flashes its own light and thereby gathers more attention to the bicycle.

Some circuits use a combination of the above to obtain even more advantages.

Figures 9, 10:
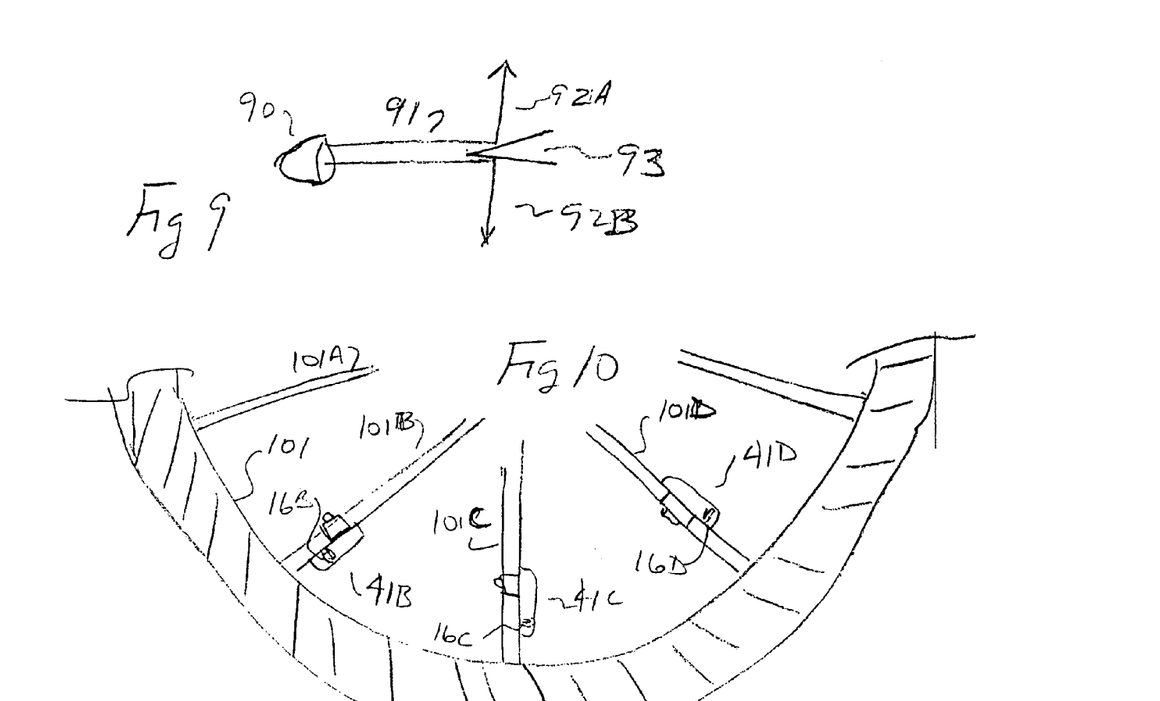
FIG. 9 illustrates the splitting of the light from the light source.
FIG. 10 illustrates the placement of alternative embodiment onto the spokes so as to assure the light is emitted parallel to the ground.

FIG. 9 illustrates the splitting of the light from the light source.

While this illustration shows the use of reflective surfaces, those of ordinary skill in the art recognize alternative methods to accomplish this function. Light source 90 creates a beam of light 91. Beam 91 impacts lens 93 and creates light beams 92A and 92B. Note, beams 92A and 92B are ideally chosen to be substantially perpendicular to beam 91; further, beams 92A and 92B may be co-linear, but are at least parallel to each other.

FIG. 10 illustrates the placement of alternative embodiment onto the spokes so as to assure the light is emitted parallel to the ground.

Wheel 101 is supported by spokes 101A, 101B, 101C, 101D, and others. On spokes 101B, 101C, and 101D are mounted housings 41B, 41C, and 41D respectively. These housings are provided with windows 16B, 16C, and 16D as outlined above and through which light is emitted. Because of the orientation of housings 41B, 41C, and 41D, regardless of the position of the spoke of the bicycle, the emitted light (directed out of the page) is substantially parallel to the ground and thereby provides optimal warning affect.

It is clear that the present invention provides a bicycle light system which is better able to protect the bicyclist.

What is claimed is:

1. A bicycle light comprising
   a) a housing having contained therein,
      1) a light source emitting light in a first direction,
      2) a battery providing energy to said light source,
      3) a lense mechanism adapted to direct light from said light source in a second direction being substantially perpendicular to said first direction, and,
      4) a switch to selectively provide connection between said battery and said light source and wherein said switch is adapted to open when said switch is not moved for a selected period of time; and,
   b) a snap clip being a nut and bolt combination adapted to maintain compression between the snap and the spoke such that said first direction is substantially parallel to the spoke.

2. The bicycle light according to claim 1, further including a timing mechanism adapted to periodically interrupt a flow of electricity from said battery to said switch.

3. The bicycle light according to claim 2, wherein said switch is adapted to close when said switch is moved.

4. The bicycle light according to claim 2,
   a) further including an ambient light sensor; and,
   b) wherein said switch is adapted to close in response to a signal from said ambient light sensor.

5. The bicycle light according to claim 2, wherein said lense mechanism includes a first and second lense held by said housing such that a beam of light from said light source strikes said first and second lense.

6. A bicycle light comprising:
a) a light source emitting light in a first direction;
b) a lense mechanism adapted to direct light from said light source in a second direction being substantially perpendicular to said first direction; and,
c) a snap clip adapted to secure said housing to a spoke of a wheel of the bicycle such that said first direction is substantially parallel to said spoke, wherein said snap clip includes a nut and screw combination adapted to maintain compression between the snap and the spoke.

7. The bicycle light according to claim 6, wherein said lense mechanism includes a first and second lense held by a housing such that light from said light source strikes said first and second lense.

8. The bicycle light according to claim 6, further including:
a) a battery; and,
b) a switch selectively connecting said battery and said light source, said switch adapted to open when said housing is not moved for a selected period of time.

9. The bicycle light according to claim 6, further including:
a) a battery;
b) an ambient light sensor; and,
c) a switch selectively connecting said battery and said light source, said switch adapted close in response to a signal from said ambient light source.

10. A bicycle light comprising
a) a housing having contained therein,
 1) a light source emitting light in a first direction,
 2) a battery providing energy to said light source, and,
 3) a lense mechanism positioned to receive light from said light source, said lense mechanism having a first and second lense and configured such that radiating light from said first lense and said second lense is substantially perpendicular to said first direction; and,
b) a snap clip adapted to secure said housing a spoke of a wheel of the bicycle such that said first direction is substantially parallel to said spoke, wherein said snap clip includes a nut and bolt adapted, when fully engaged, to compress the snap clip against the spoke.

11. The bicycle light according to claim 10, wherein said housing further includes a switch to selectively provide connection between said battery and said light source.

12. The bicycle light according to claim 11, further including a timing mechanism adapted to periodically interrupt a flow of electricity from said battery to said light source.

13. The bicycle light according to claim 11, wherein said switch is adapted to open when said housing is not moved for a selected period of time.

14. The bicycle light according to claim 11,
a) further including an ambient light sensor; and,
b) wherein said switch is adapted to close in response to a signal from said ambient light sensor.

* * * * *